United States Patent
Hodges et al.

(10) Patent No.: US 8,948,184 B2
(45) Date of Patent: **\*Feb. 3, 2015**

(54) EMBEDDED SYSTEM DEVELOPMENT PLATFORM

(75) Inventors: Stephen E. Hodges, Cambridge (GB); David Alexander Butler, Cambridge (GB); Shahram Izadi, Cambridge (GB); Chih-Chieh Han, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/439,049

(22) Filed: Apr. 4, 2012

(65) Prior Publication Data
US 2012/0198103 A1 Aug. 2, 2012

Related U.S. Application Data

(63) Continuation of application No. 11/748,389, filed on May 14, 2007, now Pat. No. 8,175,099.

(51) Int. Cl.
*H04L 12/28* (2006.01)
*G06F 13/40* (2006.01)

(52) U.S. Cl.
CPC ......... *G06F 13/4095* (2013.01); *Y02B 60/1228* (2013.01); *Y02B 60/1235* (2013.01)
USPC .......................................................... 370/394

(58) Field of Classification Search
CPC . H04W 28/0221; H04W 40/10; H04W 52/00; H04W 52/0235; H04W 52/0283
USPC ............... 370/312, 392, 394; 455/349, 343.1, 455/127.1, 412.2, 419; 709/208, 240, 243
See application file for complete search history.

(56) References Cited

U.S. PATENT DOCUMENTS

| | | | | |
|---|---|---|---|---|
| 4,712,590 A | * | 12/1987 | Gianfilippo | ...................... 141/83 |
| 4,965,550 A | * | 10/1990 | Wroblewski | .................. 340/524 |
| 5,367,300 A | * | 11/1994 | Fong et al. | ..................... 341/101 |
| 5,590,349 A | | 12/1996 | Robinson et al. | |
| 5,732,273 A | | 3/1998 | Srivastava et al. | |
| 5,963,454 A | | 10/1999 | Dockser et al. | |
| 6,026,221 A | | 2/2000 | Ellison et al. | |
| 6,041,406 A | | 3/2000 | Mann | |

(Continued)

OTHER PUBLICATIONS

Agrawal, et al., "Real-time Embedded Software Systems", available at least as early as Nov. 27, 2006, at <<http://www.tcs.com/0_service_practices/ATC_new/offerings/downloads/RTSS-4.pdf>>, TATA Consultancy Services, 2001, pp. 25.

(Continued)

*Primary Examiner* — Robert C Scheibel
*Assistant Examiner* — Ajay Cattungal
(74) *Attorney, Agent, or Firm* — Miia Sula; Micky Minhas; Lee & Hayes PLLC

(57) ABSTRACT

A modular development platform is described which enables creation of reliable, compact, physically robust and power efficient embedded device prototypes. The platform consists of a base module which holds a processor and one or more peripheral modules each having an interface element. The base module and the peripheral modules may be electrically and/or physically connected together. The base module communicates with peripheral modules using packets of data with an addressing portion which identifies the peripheral module that is the intended recipient of the data packet.

20 Claims, 13 Drawing Sheets

(56) References Cited

U.S. PATENT DOCUMENTS

| | | | |
|---|---|---|---|
| 6,487,400 B2* | 11/2002 | Joeressen et al. | 455/343.1 |
| 6,556,345 B1* | 4/2003 | Gassner et al. | 359/341.4 |
| 6,691,183 B1 | 2/2004 | Ryan, Jr. | |
| 6,769,115 B1 | 7/2004 | Oldman | |
| 6,917,998 B1 | 7/2005 | Giles | |
| 6,957,371 B2 | 10/2005 | Ricchetti et al. | |
| 6,973,591 B2 | 12/2005 | Debling | |
| 6,978,234 B1 | 12/2005 | Battaline et al. | |
| 7,024,660 B2 | 4/2006 | Andrade et al. | |
| 7,035,344 B2* | 4/2006 | Feher | 375/271 |
| 7,035,693 B2* | 4/2006 | Cassiolato et al. | 700/1 |
| 7,089,173 B1 | 8/2006 | Molson et al. | |
| 7,089,535 B2 | 8/2006 | Bates et al. | |
| 7,363,521 B1 | 4/2008 | Mehan | |
| 7,499,863 B2 | 3/2009 | Spitzer | |
| 7,558,975 B2* | 7/2009 | Mehan | 713/310 |
| 7,913,243 B2 | 3/2011 | Axnix et al. | |
| 7,917,899 B2 | 3/2011 | Ota et al. | |
| 7,926,047 B2 | 4/2011 | Drepper | |
| 2002/0059054 A1 | 5/2002 | Bade et al. | |
| 2002/0094803 A1* | 7/2002 | Burgan et al. | 455/412 |
| 2003/0009453 A1* | 1/2003 | Basso et al. | 707/3 |
| 2003/0014540 A1* | 1/2003 | Sultan et al. | 709/240 |
| 2003/0066082 A1* | 4/2003 | Kliger et al. | 725/80 |
| 2003/0074180 A1 | 4/2003 | Shibayama et al. | |
| 2003/0079077 A1* | 4/2003 | Piau et al. | 711/103 |
| 2003/0093433 A1 | 5/2003 | Seaman et al. | |
| 2003/0206503 A1* | 11/2003 | Kosoburd et al. | 369/44.29 |
| 2004/0246961 A1* | 12/2004 | Dai et al. | 370/392 |
| 2005/0038665 A1* | 2/2005 | Hasebe | 705/1 |
| 2005/0064829 A1* | 3/2005 | Kang et al. | 455/127.1 |
| 2005/0077355 A1* | 4/2005 | Yamamoto et al. | 235/439 |
| 2005/0114710 A1* | 5/2005 | Cornell et al. | 713/201 |
| 2005/0246469 A1* | 11/2005 | Chu | 710/301 |
| 2005/0283625 A1* | 12/2005 | Rotem et al. | 713/300 |
| 2006/0113960 A1* | 6/2006 | Thulesius et al. | 320/133 |
| 2006/0121931 A1* | 6/2006 | Lin et al. | 455/550.1 |
| 2006/0123279 A1 | 6/2006 | Cardinell | |
| 2006/0125485 A1 | 6/2006 | Casey | |
| 2006/0200796 A1 | 9/2006 | Ota et al. | |
| 2006/0250980 A1* | 11/2006 | Pereira et al. | 370/254 |
| 2006/0285510 A1* | 12/2006 | Kim et al. | 370/312 |
| 2007/0005342 A1 | 1/2007 | Ortscheid | |
| 2007/0006201 A1 | 1/2007 | Axnix et al. | |
| 2007/0065148 A1* | 3/2007 | Behr et al. | 398/38 |
| 2007/0294683 A1 | 12/2007 | Lee et al. | |
| 2008/0127154 A1 | 5/2008 | Drepper | |
| 2008/0132291 A1* | 6/2008 | Barr et al. | 455/567 |
| 2008/0242287 A1* | 10/2008 | Luciani | 455/419 |
| 2008/0288666 A1 | 11/2008 | Hodges et al. | |

OTHER PUBLICATIONS

Beigl, et al., "Smart-Its: An Embedded Platform for Smart Objects", available at least as early as Nov. 28, 2006, at <<http://www.cc.gatech.edu/computing/classes/AY2004/cs4470_fall/readings/smart-its-soc2003.pdf>>, pp. 4.

Beutel, et al., "PrototypingWireless Sensor Network Applications with BTnodes", available at least as early as Nov. 28, 2006, at <<http://www.vs.inf.ethz.ch/res/papers/prototyping-btnode.pdf>>, pp. 16.

Costa, et al., "Towards a Services Platform for Mobile Context-Aware Applications", available at least as early as Nov. 28, 2006, at <<http://wwwhome.cs.utwente.nl/~pires/publications/iwcu2004.pdf>>, pp. 14.

"DSP System Designers: Relax, It's Programmable", available at least as early as Nov. 27, 2006, at <<http://www.altera.com/literature/nv/02nvq3.pdf>>, Altera Corporation Third Quarter, 2002, pp. 38.

Girod, et al., "EmStar: a Software Environment for Developing and Deploying Wireless Sensor Networks", retrieved on Nov. 28, 2006, at <<http://www.usenix.org/events/usenix04/tech/general/full_papers/girod/girod_html/eu.htmlu>>, Lewis Girod, 2004, pp. 27.

Hodges, et al., "wasp: a platform for prototyping ubiquitous computing devices", Apr. 20, 2006, pp. 2.

Lister, et al., "A SystemC based Virtual Prototyping Methodology for Embedded Systems", retrieved on Nov. 28, 2006, at <<http://www.us.design-reuse.com/articles/article11104.html>>, Design and Ruse S.A., 2006, pp. 10.

"Management Information Base", retrieved on May 14, 2007, at <<http://en.wikipedia.org/wiki/Management_information_base>>, Wikimedia Foundation Inc., pp. 3.

"Simple Network Management Protocol", retrieved on May 14, 2007, at < http://en.wikipedia.org/wiki/Simple_Network_Management_Protocol>>, Wikimedia Foundation Inc., pp. 14.

"Virtual Platforms", retrieved on Nov. 28, 2006, at <<http://www.virtio.com/products/virtualPlatforms/0,2261,0,00.html>>, Virtio, 1999-2006, pp. 2.

Final Office Action for U.S. Appl. No. 11/748,389, mailed on Jan. 5, 2011, Stephen Hodges, "Embedded System Development Platform", 21 pages.

Final Office Action for U.S. Appl. No. 11/748,389, mailed on Mar. 12, 2010, Stephen Hodges, "Embedded System Development Platform", 18 pages.

Office Action for U.S. Appl. No. 11/748,389, mailed on Jul. 30, 2010, Stephen Hodges, "Embedded System Development Platform", 18 pages.

Office Action for U.S. Appl. No. 11/748,389, mailed on Sep. 18, 2009, Stephen Hodges, "Embedded System Development Platform", 18 pages.

Office Action for U.S. Appl. No. 11/748,395, mailed on Jan. 11, 2012, Stephen Hodges, "Encoding of Symbol Table in an Executable", 18 pgs.

Office action for U.S. Appl. No. 11/748,395, mailed on Oct. 30, 2012, Hodges et al., "Encoding of Symbol Table in an Executable ", 20 pages.

Office action for U.S. Appl. No. 11/748,395, mailed on Jul. 10, 2012, Hodges et al., "Encoding of Symbol Table in an Executable ", 21 pages.

Non-Final Office Action for U.S. Appl. No. 11/748,395, mailed on Aug. 26, 2011, Stephen Hodges, "Encoding of Symbol Table in an Executable", 13 pages.

* cited by examiner

TOP VIEW

CROSS SECTION

TOP VIEW

CROSS SECTION

EMBEDDED SYSTEM DEVELOPMENT PLATFORM

PRIORITY APPLICATION

This application is a continuation of and claims priority from U.S. patent application Ser. No. 11/748,389, titled "EMBEDDED SYSTEM DEVELOPMENT PLATFORM", filed on May 14, 2007, which is herein incorporated by reference.

BACKGROUND

Trials of consumer computing devices with end-users at an early stage in the development process can provide very useful information which enables a developer to assess the value of the device and determine whether it warrants further development. Feedback from trials can also inform developers about changes that may be required to the device to make it more useful, more user friendly etc. Such trials require the production of prototype devices which is time consuming and expensive, particularly because several iterations are likely to be required. This is particularly applicable to development of embedded hardware, which is often integral to consumer computing devices, due to the electronic and industrial design requirements that accompany software development.

These problems in developing prototypes for user trials are compounded by the fact that users are used to sophisticated technology and in order for trials to be effective, the prototypes need to be sufficiently representative of the final product in terms of size, weight, robustness, performance etc. Use of large, unwieldy prototypes in user trials can result in meaningless data because the users are unable to see beyond the shortcomings of the prototype and therefore they do not use the devices in a realistic manner. However to develop representative prototypes it is necessary to perform virtually the same steps as for creating the actual product, e.g. designing a PCB and having it made and assembling the device. This leads to large upfront costs and is very time-consuming and expensive to iterate because PCB re-spins will almost certainly be required.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A modular development platform is described which enables creation of reliable, compact, physically robust and power efficient embedded device prototypes. The platform consists of a base module which holds a processor and one or more peripheral modules each having an interface element. The base module and the peripheral modules may be electrically and/or physically connected together. The base module communicates with peripheral modules using packets of data with an addressing portion which identifies the peripheral module that is the intended recipient of the data packet.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
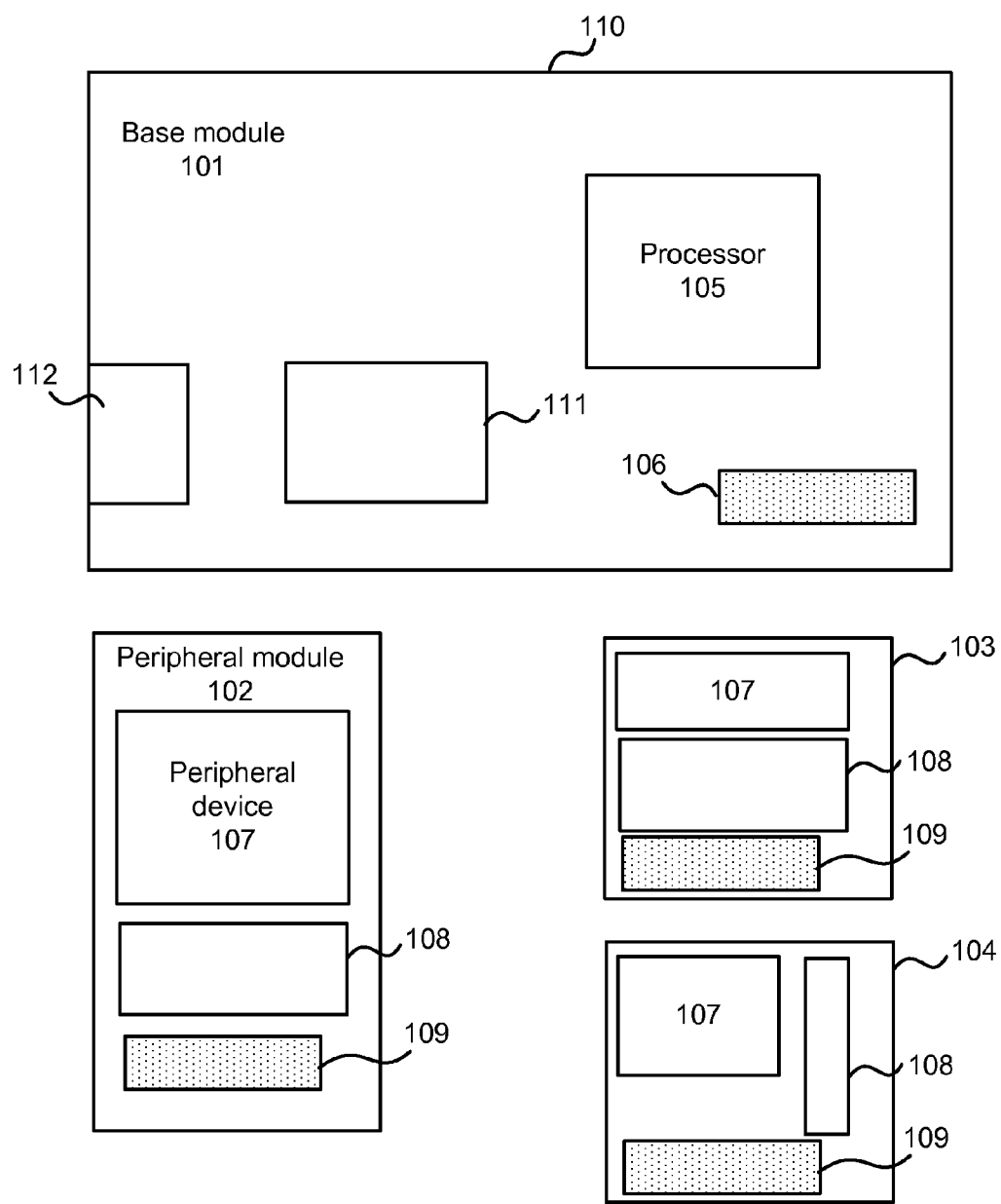
FIG. 1 shows a schematic diagram of elements of a modular development platform.

By using a modular development platform, representative prototypes can be developed for use in user trials (or for any other purpose, including sale) which are reliable, compact, physically robust and power efficient. The platform may also be used for small scale production (e.g. production quantities of less than a few hundred of an item per year). FIG. 1 shows a schematic diagram of elements of such a modular development platform, including a base module 101 and a number of peripheral modules 102-104. Each module is small (e.g. the base module 101 may be approximately 34 mm×51 mm) and can be connected together physically and electrically, as described in more detail below, to form a particular complete embedded device.

The base module 101 comprises a processor 105 such as a microcontroller, microprocessor or any other suitable type of processor. The base module 101 also comprises a header 106 or other connector which is used to electrically connect the base module to one or more peripheral devices. The processor and header may be mounted on a PCB 110 (such as a multi-layer PCB) or any other suitable base substrate. The substrate used may, as required by the application, be substantially rigid or flexible. The base module may include additional elements, such as a battery 111 (e.g. a lithium-ion battery), additional connectors 112 (e.g. a mini-USB connector), connectors, sockets, components, circuitry etc. The additional connector(s) 112 may be used to provide power to the module, to re-program the processor and/or in debugging the device. The base module may also comprise a second battery for maintaining the real time clock (e.g. as a back up battery). In an example, the base module may comprise an ARM7 microcontroller with a USB interface, real time clock and power regulation (including a lithium-ion battery charger) and the USB connection (via connector 112) may be used to re-charge the lithium-ion battery 111. In other examples, the battery (or an additional battery) may be provided as a peripheral module.

The modular development platform may include many different peripheral modules, each comprising a peripheral device 107, an interface element 108 and a header 109 or other connector which is used to connect the peripheral module to the base module and/or other peripheral modules. The interface element 108 is designed to interface between the signals received via the header 109 and the peripheral device 107 and may comprise a microcontroller or other processor. The interface element may be arranged to manage the powering down of the peripheral device 107 when not in use and the wake up of the peripheral device when required, as described in more detail below. The interface element may also be arranged to control the communication from the peripheral to the base module, as described in more detail below. A peripheral module may also include additional elements, such as a battery, interfaces, connectors, sockets, components, circuitry etc.

The peripheral modules may be powered from the base module over a bus (described in more detail below). Alternatively, or in addition, peripheral modules may include a battery. Where a peripheral module requires high currents (e.g. >0.5 A, for example a GSM modem) a local battery may be provided as, dependent on the bus design, the current over the bus may be limited. Where a peripheral module includes a battery, this may provide power just to that peripheral module, or in some examples, the battery may also provide power to the base module and/or to other peripheral modules. Where batteries are provided on peripheral modules, these may be rechargeable and in some examples, the recharging may be performed over the bus with a single recharging point provided on the base module (e.g. connector 112).

The peripheral devices 107 may themselves comprise modules, for example which include a microcontroller and expose their functionality through an asynchronous interface such as UART (Universal Asynchronous Receiver Transmitter i.e. RS232 serial). Examples of peripheral devices include, but are not limited to, a GSM/GPRS/3G modem, a Bluetooth transmitter/receiver/transceiver, a GPS receiver, a WiFi module, a ZigBee (trade mark) module, memory modules (e.g. Flash memory), a VGA camera, a display, a touch sensor, an accelerometer, a magnetometer and basic I/O for LEDs, servers, buzzers etc. Additional processors may also be provided on a peripheral module. Further inputs to and/or outputs from the processor and communications devices may be provided by peripheral modules.

By using a well defined interface, additional peripheral modules can be developed as required without requiring modification of the base module or any other peripheral modules (i.e. it is a self-contained task). Additionally, by using a well-defined interface, this assists in managing the complexity of both the hardware and the firmware.

Whilst in FIG. 1, the interface elements 108 on the peripheral modules 102-104 are shown separately from the peripheral devices 107 themselves, in some examples the peripheral devices and the interface elements functionality may be integrated into a single device.

Exemplary Methods of Physically Connecting Modules

The modules 101-104 may be physically connected together in any combination to form a required embedded device. By using standard module sizes, such as modules which are a multiple of a defined smallest unit, the modules fit together easily and can be assembled in many different, space-efficient combinations and orientations, whether arranged in a planar or stacked configuration or a combination of the two. For example, as shown in FIG. 1, the smaller peripheral modules 103, 104 may be deemed the smallest unit size, with the larger peripheral 102 being twice the unit size and the base module 101 being six times the unit size. In an example, the smallest unit size may be 17 mm by 17 mm.

Figure 2:
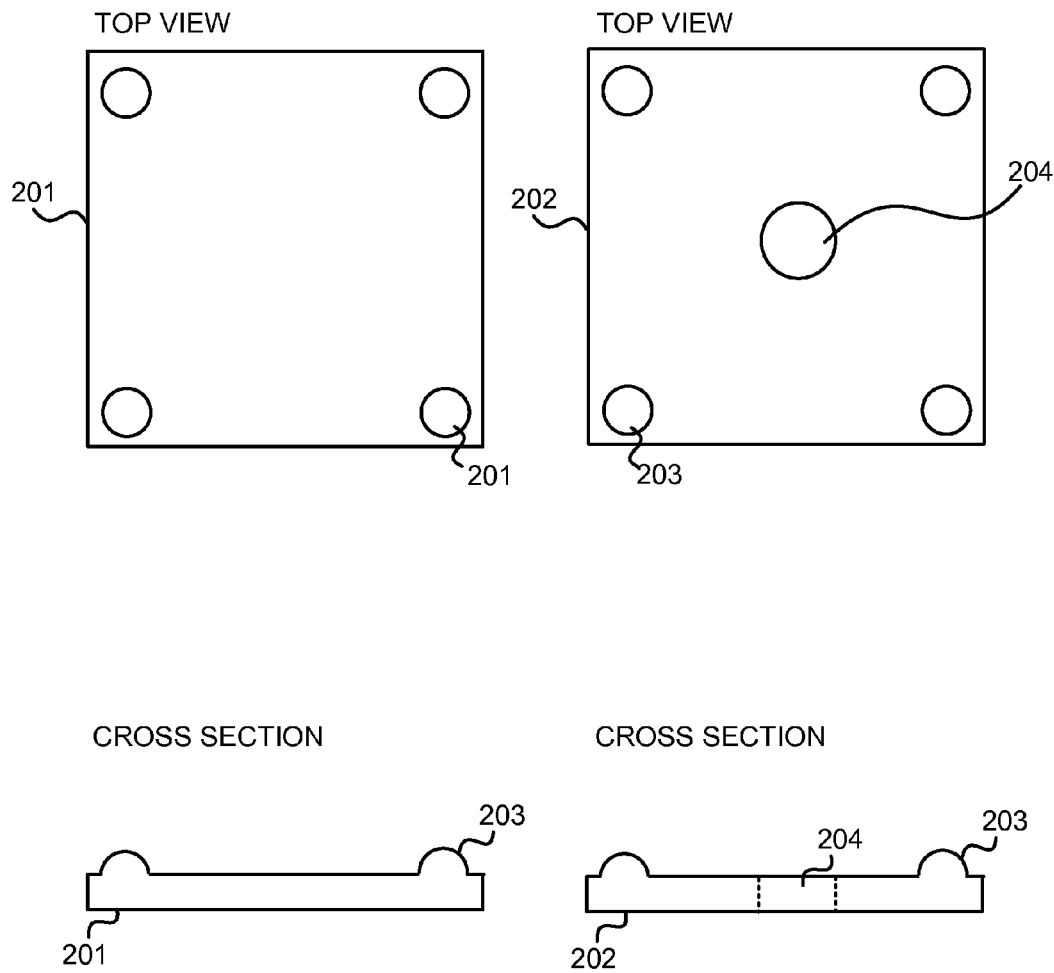
FIG. 2 shows a top view and a cross-sectional view of each of two example joining plates.

Two exemplary methods of physically connecting the modules can be described with reference to FIGS. 2-4. FIG. 2 shows a top view and a cross-sectional view of each of two example joining plates (or connector tabs) 201, 202 which may be used to connect the modules together. Both example joining plates are substantially square and have raised protrusions 203 located on the top surface near to each corner. The second example joining plate 202 additionally has a through hole 204 at the centre of the top surface and in this example, the hole 204 is substantially circular in cross-section with substantially straight side walls (as shown by the dotted lines in the side view).

Figure 3:
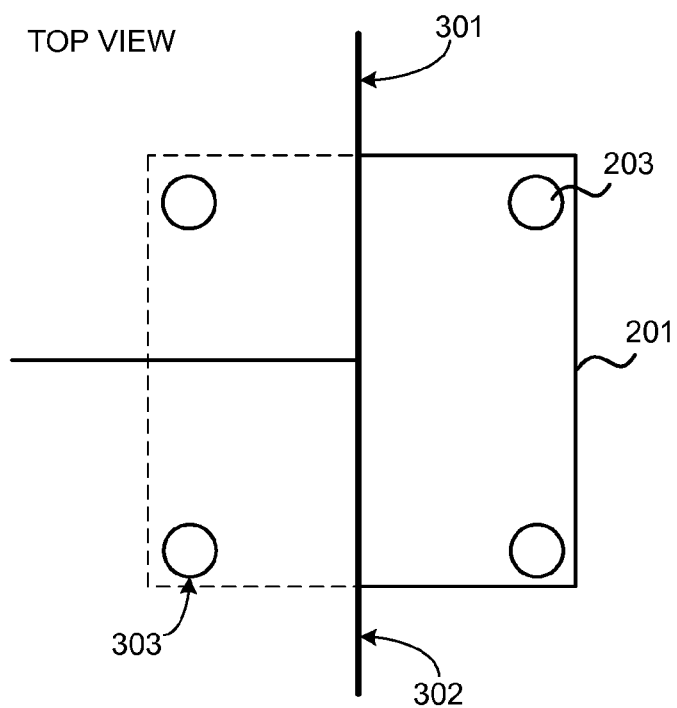
FIG. 3 shows a schematic diagram of a first example joining plate in use.
Figure 3:
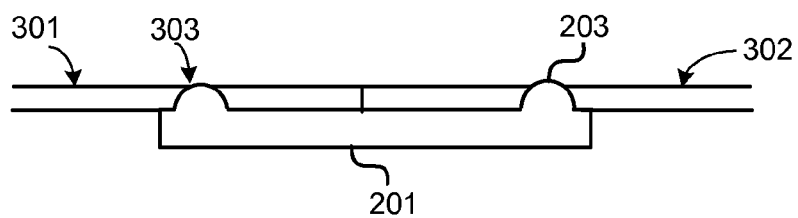

FIG. 3 shows the first example joining plate 201 being used to physically connect two modules 301, 302 together and again a top view and a cross-sectional view are shown. The modules 301, 302 have holes 303 at each corner which correspond to the protrusions 203 on the joining plate 201. Whilst these holes 303 are shown as through holes, in other examples the holes may be recesses which correspond to the protrusions. The edges of the modules are brought into contact and the joining plate 201 is placed under the two modules such that a protrusion 203 on the plate can be inserted into the corresponding holes 303 on the modules. The joining plates may be made from resilient material such that the protrusions can be deformed slightly when pressed into the holes (e.g. a plastic material) in order that the plate remains in position until forcibly removed.

Figure 4:
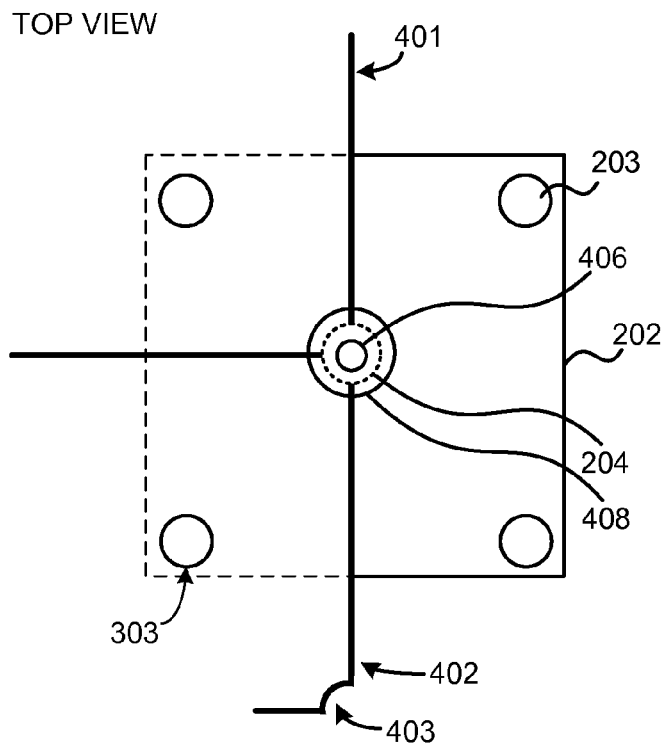
FIG. 4 shows a schematic diagram of a second example joining plate in use.
Figure 4:
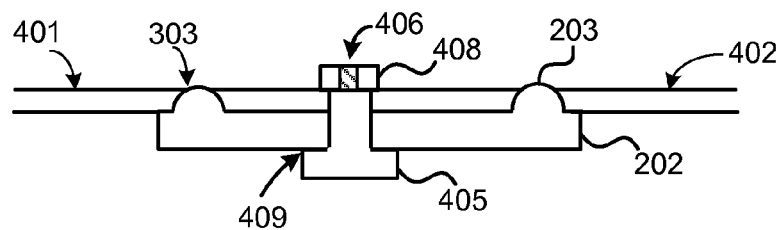

FIG. 4 shows the second example joining plate 202 being used to physically connect two modules 401, 402 together, in a corresponding manner to that shown in FIG. 3 for the first example joining plate. In this example, however, the modules are not held in place simply by the fact that the protrusions 203 are inserted into holes 303 on the modules, but instead an additional joining member (or mounting pillar) 405 is used, which provides increased physical robustness. Each of the modules 401, 402 has a cut-out 403 at some or all corners (and potentially in other positions as described in more detail below) which corresponds to the hole 204 in the centre of the joining plate 202. When the corners of the modules to be joined are brought together, the joining plate is placed under the modules such that a protrusion 203 on the plate can be inserted into the corresponding holes 303 on the modules. The joining member 405 can then be inserted through the hole, as shown in the cross-sectional view and used to clamp the modules and joining plate together. This clamping action may be achieved by means of a shoulder 409 and a threaded portion 406 such that when a nut 408 is screwed onto the threaded portion, the joining plate and module substrates are clamped between the lower surface of the nut and the shoulder on the joining member.

FIGS. 3 and 4 show the joining plates being used to connect together two modules. The example joining plates shown may be used to connect the corners of up to four modules together. It will be appreciated that the particular shape and configuration of the joining plates shown in FIG. 2 and described above is by way of example only and many alternative shapes/configurations may be used, (e.g. more/fewer protrusions, different shape protrusions, different shape plates etc). Joining modules, and in particular the smallest modules, at the corners, provides the most space for routing a ribbon cable.

Figure 5:
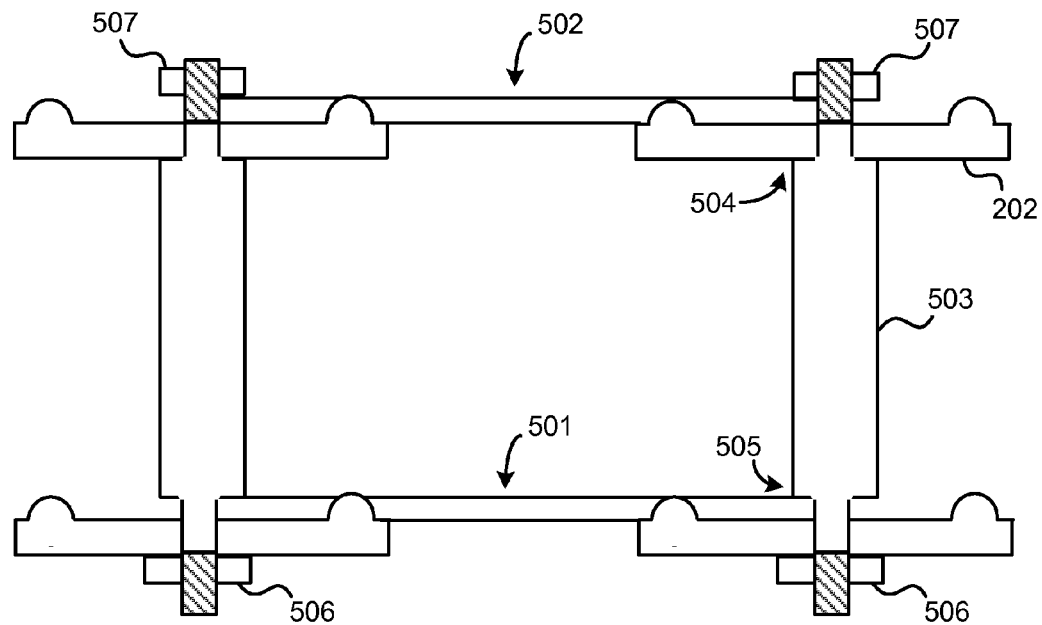
FIG. 5 shows a first example method of stacking modules.
Figure 6:
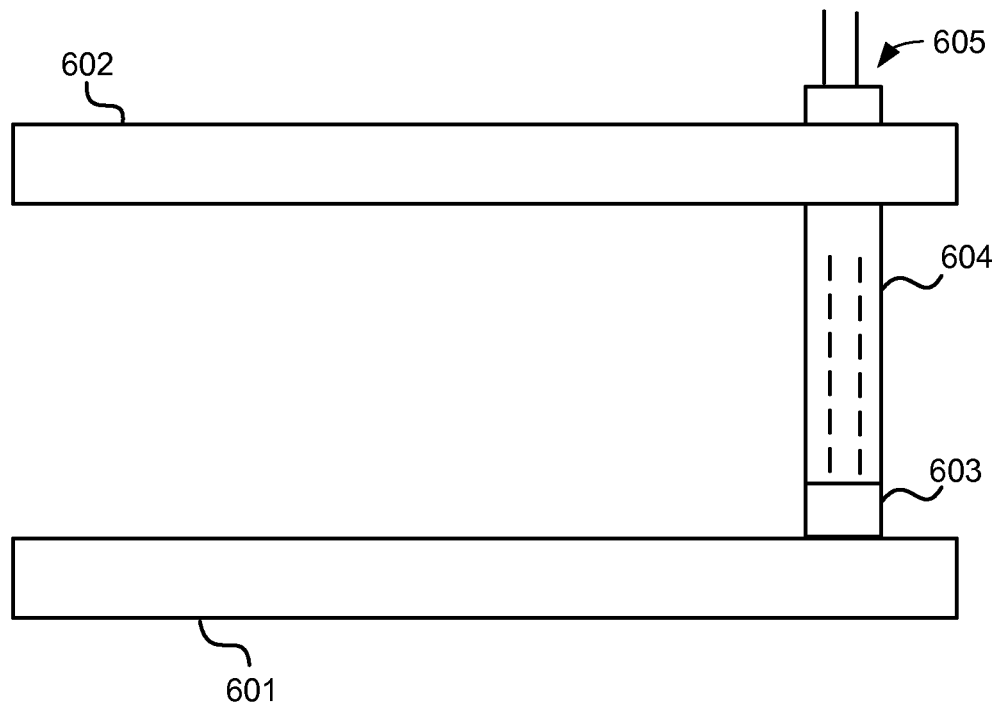
FIG. 6 shows a second example method of stacking modules.

FIGS. 3 and 4 show the physical connection of modules together in a single plane (e.g. a horizontal plane). In addition, or instead, modules may be stacked vertically as shown in FIGS. 5 and 6. FIG. 5 shows a first example method of stacking modules 501, 502 vertically which uses a modified joining member 503 which has a wider central section with two shoulders 504, 505 and a narrower threaded portion at each end such that a first set of nuts 506 can be used to clamp the lower substrate 501 in place and a second set of nuts 507 can be used to clamp the upper substrate 502 in place. The spacing of the two substrates is set by the length of the wider central section. Although FIG. 5 shows the use of standard joining plates 202, different joining plates may be used, particularly when if it is only necessary to join modules together in a vertical stack and not connect any modules horizontally (i.e. along their edges). In some examples, different joining plates may be used depending on the application and the number of modules that are required to be connected (e.g. a different plate design for joining two modules compared to joining four modules).

It will be appreciated that the shoulder/threaded portion arrangement to enable the joining member in combination with the nut to clamp the modules and joining plate together (as shown in FIGS. 4-5) is just one suitable arrangement. Other suitable arrangements include: use of a member (e.g. a nut or cap) which snaps onto the top of the joining member (and therefore does not require a threaded portion) and the use of two nuts (e.g. screwed or snapped into place) attached to the joining member (one as shown in FIG. 4 and the second located below the joining plate to perform a similar function to the shoulder portion shown in FIG. 4). In another example, the joining members may be magnetic.

The joining members 405, 503 described above may also be used to fix the modules onto a rigid surface, such as onto a housing or rigid interconnect PCB (if that method of electrical interconnection used, as described below). For example, using the modified joining member 503, the lower threaded portion may be screwed into an appropriate threaded recess in a base or housing. This fixing of the modules to a rigid element further increases the physical robustness of the assembled embedded system.

The joining plates and/or joining members may, in some examples, be used to provide an electrical connection between modules and/or between modules and the case (e.g. to provide a common ground plane). In such an example, the joining members may be made from a conductive material (e.g. a metal or a loaded polymer/ceramic) or the joining members may have a conductive coating or layer.

FIG. 6 shows a second example method of stacking modules 601, 602 vertically which uses the electrical header connections 602, 603 to make the vertical connection. In the example shown a single male header 603, 605 is mounted on the top face of each module and a single female header 604 is mounted on the underside of the top module 602 (or on the underside of each module). By connecting the male header 603 on the first module 601 and the female header 604 on the second module 602, the two modules are stacked vertically. It will be appreciated that in other examples, different numbers or arrangements of headers may be used. The headers which are used to physically connect the modules together in the vertical stack may also be used to provide electrical connectivity between the modules. This electrical connectivity may be in the form of a high-speed serial bus (as described in more detail below) or may provide a common ground plane or other electrical functionality.

A third example method of stacking modules comprises a combination of the methods shown in FIGS. 5-6 and described above. In such an example, both electrical headers and mounting pillars may be used to fix together modules which are stacked on top of each other.

Figure 7:
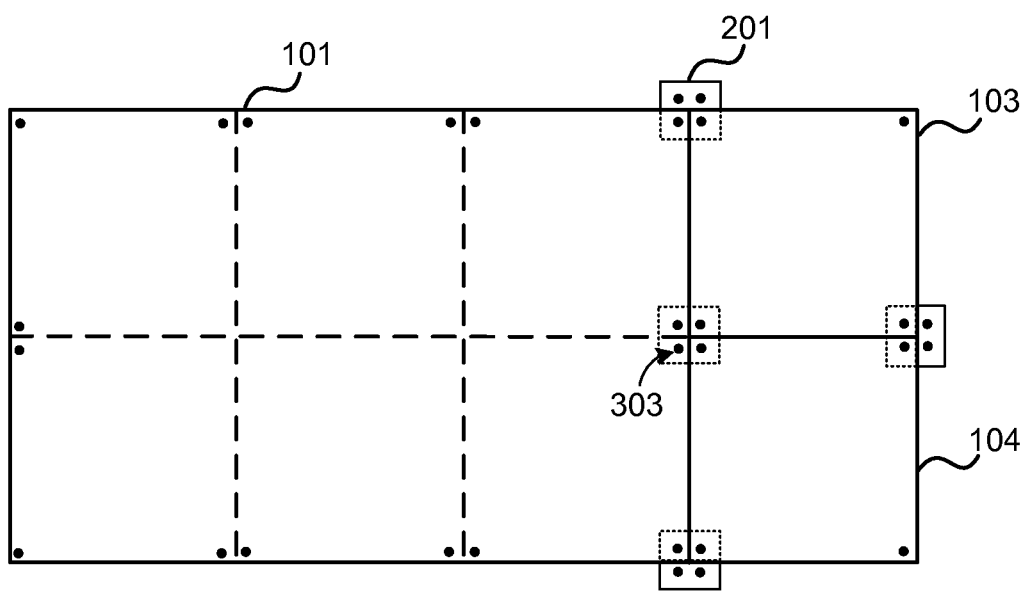
FIG. 7 shows a schematic diagram of a further method of joining modules.

Whilst the examples above show modules being connected together at corners, they may additionally (or instead) be connected along the edges of modules, particularly where there is quite a large range in sizes of modules. For example, if the base module 101 (as shown in FIG. 1) is physically connected to two small peripheral modules 103, 104, edge mounting may be used in combination with corner mounting, as shown in FIG. 7. In this example, four joining plates 201 are shown being used to connect the three modules 101, 103, 104 with the larger base module 101 having joining holes 303 along the edges of the module in addition to at the corners. If the small peripheral modules 103, 104 are considered to represent the smallest module unit size, the larger modules (such as base module 101 and peripheral module 102) may have joining holes at regular points along their sides (as shown in FIG. 7, with the unit size being indicated on the base module by the dotted lines).

In a further example of a method of physically connecting modules together, the joining plates may be formed (e.g. with 90° bend in them) such that the modules can be mounted in an orientation where they are not all parallel to each other. For example, six modules may be connected together to form a cuboid.

The joining members may include flanges, walls, base plates etc in order that a protective case can be formed around the assembled device. In an example, domed protective covers (e.g. made from a plastic material) may be fixed to the assembled device to provide physical protection. Whilst the protection provided is physical, in some examples the case may also provide electrical protection (e.g. in the form of a Faraday cage).

The methods described above are provided by way of example and other methods may be used to physically connect the modules together. Furthermore, aspects of any of the methods may be combined with aspects of any of the other methods or with methods not described in order to achieve the same effect of physically connecting the modules together.

Exemplary Methods of Electrically Connecting Modules

Figure 8:
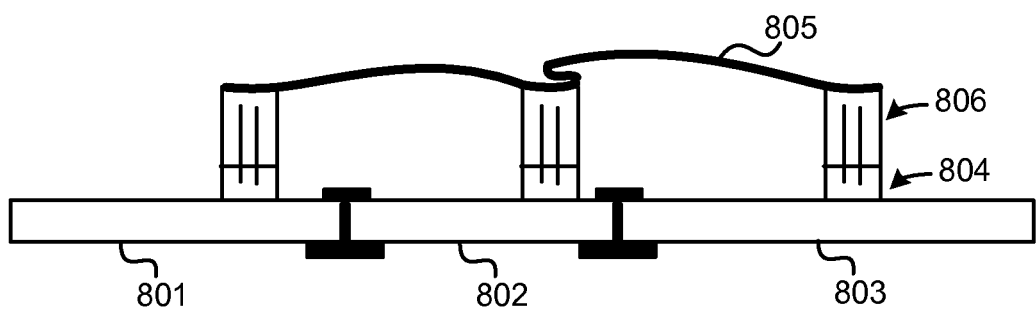
FIG. 8 shows a schematic diagram of a method of electrically connecting modules.
Figure 9:
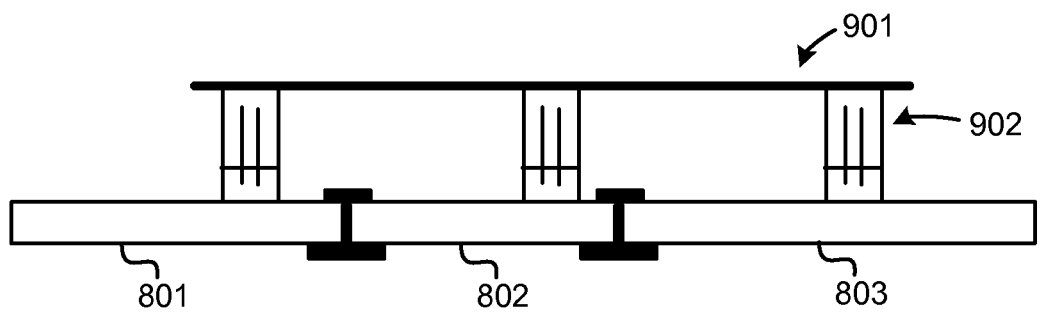
FIG. 9 shows a schematic diagram of another method of electrically connecting modules.
Figure 10:
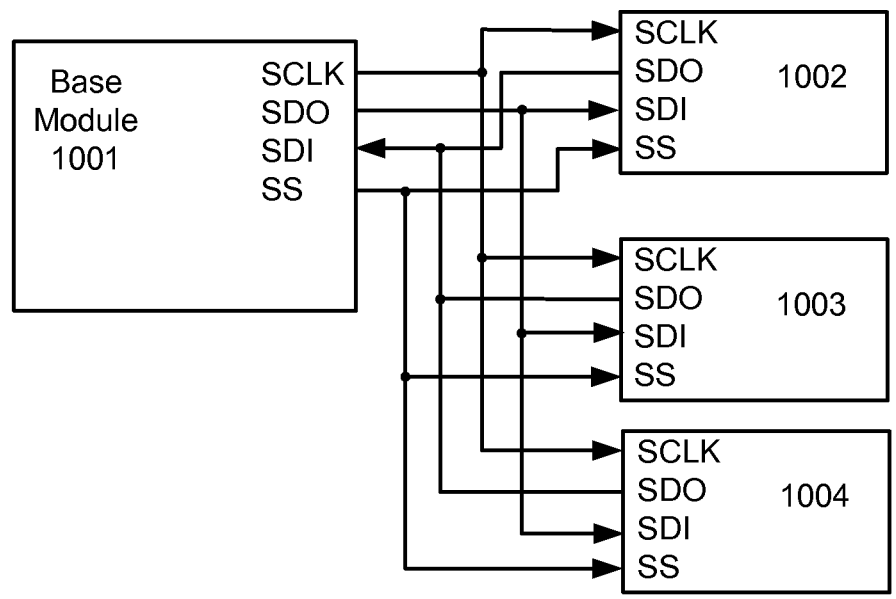
FIG. 10 shows a schematic diagram of the electrical connections between modules.

As described above and shown in FIG. 1, each module may comprise a header 106, 109 or other electrical connector (e.g. a 0.05" or 1.27 mm pitch connector or header) to enable the modules to be electrically connected together and as described above (and shown in FIG. 6) these headers may, in some examples, be used to physically connect modules together. In an example, a 0.05" or 1.27 mm pitch 2×5 way connector or header may be used. The modules may be electrically connected together either board-to-board (e.g. as shown in FIG. 6), board-ribbon cable-board (as shown in FIG. 8) or via one or more flexible or rigid mid-plane PCBs (as shown in FIG. 9). In another example, a flexible PCB may be used instead of a ribbon cable (e.g. in a similar manner to that shown in FIG. 8). The methods and protocols used to communicate between boards are described in more detail below.

FIG. 8 shows a schematic diagram of three modules 801-803 each having a header 804 that are electrically connected by means of a ribbon cable 805 (e.g. a 0.025" or 0.635 mm pitch ribbon cable) whilst FIG. 9 shows a schematic diagram of the three modules 801-803 electrically connected by means of a mid-plane PCB 901. As described above, this mid-plane PCB, if substantially rigid, may be used to provide increased robustness to the assembled embedded device by fixing the joining members to the mid-plane PCB. Both the ribbon cable 805 and the mid-plane PCB 901 have headers 806, 902 or other connectors which are able to connect to the headers 804 on the modules. Whilst the mid-plane PCB 901 in FIG. 9 is shown with headers 902 on a single side, this is by way of example only, and the PCB may have headers on both sides. In further examples, a combination of electrical connection methods may be used and whilst the modules are shown arranged in a horizontal plane in FIGS. 8 and 9, this is by way of example only and the modules may be physically connected in any orientation and using any method (e.g. any combination of those described above).

As described above, the joining plates/members may be used to provide additional electrical connections between modules, for example to provide a common ground plane and/or to connect the module ground(s) to the casing of the device.

Exemplary Methods of Communicating Between Modules

The electrical interconnect between modules is selected to be reasonably high speed (e.g. 10-20 Mhz or faster than $I^2C$ which runs at 400 kbps) but only use a small number of wires (e.g. ≤10 wires in some examples). Whilst interconnects requiring large numbers of wires could be used, this would require larger connectors/headers on each module and this would limit the minimum size of a module and hence impact the compactness of the assembled device. Smaller cables are also easier to route between modules and therefore use of larger cables may also impact the compactness because of space required to route cables.

In an example, the interconnect may be based on SPI (serial peripheral interface) or a variant of SPI called Microwire. However, as standard SPI requires a dedicated wire for each peripheral on the bus, this limits the number of peripherals which may be used. Therefore a modified scheme may be used in which an addressing portion (such as an addressing byte) is sent at the beginning of each packet of information and this is read and interpreted by the interface element 108 on each peripheral to determine whether the packet of information is intended for that peripheral. The addressing portion may identify a single peripheral device or in some examples multicast addressing may be enabled such that more than one peripheral device may be identified within an addressing portion (e.g. to enable a signal to be sent which causes multiple peripheral modules to go to sleep). The modified SPI bus comprises three logic signals: serial clock (SCLK) which is output by the base module, serial data in (SDI) and serial data out (SDO). The SDI and SDO lines may alternatively be named master output, slave input (MOSI) and master input, slave output (MISO). The slave select (SS or chip select) signal is not used as it would be in a standard SPI bus as the peripheral module is selected by means of the addressing byte, as described above. There may still be a slave select line which causes each peripheral to listen (on its SDI) for a packet of information. In other examples, the SS may be omitted and a protocol used to determine when the peripheral modules listen for packets of information (e.g. for a finite time after a rising edge). Open collector logic (or equivalent) may be used to control which peripheral is able to communicate with the base module at any time.

Peripheral modules may be assigned unique addresses manually, for example using a tool into which each peripheral module is plugged in turn. This tool may communicate with the module using SPI, a bidirectional single wire communication means (as described in more detail below) or any suitable method. Alternatively, the addresses may be allocated across the bus (e.g. on initial power up).

In such an example using the modified SPI scheme, the interface on the base module 101 comprises a standard SPI interface (which is built into most microcontrollers but may be a discrete element) whilst the interfaces on each peripheral module 102-104 comprise a modified SPI interface which may be implemented (in an interface element 108) using a dedicated microcontroller (or other processor) running special code. When the interface element 108 detects an addressing portion which corresponds to the particular peripheral module, it passes the data portion to the peripheral device 107. The interface element may also be arranged to perform protocol conversion to other interfaces, if required, such as RS232 or $I^2C$. The interface element may also be used to discover and identify peripherals connected to the bus by running a suitable discovery protocol on the base module and the interface element.

If the physical length of the bus is small and the number of peripherals limited (e.g. no more than ten peripherals in a single embedded device), the SPI interface can run at 10 MHz, which is the maximum speed supported by typical SPI devices and tools. As described above, many peripheral devices 107 expose their functionality through an asynchronous interface such as UART and therefore a 10 MHz bus is adequate for communication between the processor 105 on the base module 101 and the peripherals.

Each peripheral module may be designed to have a low power consumption, however, in addition to (or instead of) this, the addressing byte may also be used by the interface element in controlling the powering down and powering up (also referred to as 'waking up') of the peripheral device (and potentially other devices in the module). This duty cycling of the peripheral device may provide a significant reduction in power consumption (and hence a corresponding increase in battery life) of an assembled device. In an example implementation, peripheral modules may draw less than 10 µA when the peripheral devices are powered down (also referred to being in 'standby' mode). Where a peripheral device draws significant current in standby mode, the power to the device may be switched off on powering down in order to further conserve power.

Where the powering down is implemented by turning off the power to the peripheral device, this may cause the peripheral device to lose all state information. Whilst in some situations this may not have any impact, in situations where state information may be required to be maintained by the peripheral device, the interface element may first access and store the state information before turning off the power and then on power up the interface element may input the state information into the peripheral device. In a further example, the processor 105 on the base module 101 may read and store the state information and pass it back to the peripheral module and device on power up. Caching the state information by the interface element rather than by the central processor 105 results in less traffic across the bus (and therefore less risk of congestion) and simpler processor code.

Whilst the powering down may be initiated by the base module (by sending a power down instruction to the particular peripheral module(s)), in some embodiments, the interface element may initiate powering down of its associated peripheral device. In this case, the interface element may inform the base module that it is about to power down the peripheral device or may inform the base module in the next message provided to the base module.

In some examples modules may need to be powered up in a particular sequence or it may be beneficial to stagger the power up of modules to manage the power drain on the battery. This may be managed via the interface elements 108 on each peripheral device or alternatively by the base module. In an example, the base module may address modules in sequence to ensure that they are powered up in the correct sequence. In a second example, the interface elements 108 introduce a pre-defined delay in powering up a peripheral module, where the pre-defined delay is set such that peripherals will power up in the required sequence (e.g. the first peripheral has no delay, the second peripheral has a 10 ms delay, the third peripheral has a 20 ms delay etc). The pre-defined delay may be configured using the bidirectional single wire communication means described above. In a third example, the delay may be random (or have a random element). On powering up a peripheral device, calibration may be required (e.g. for a peripheral device which is a touch sensor) before the device is ready for us. The interface element may enable the calibration to take place and then indicate to the processor on the base module that the peripheral device is ready.

In some examples, the interface element 108 may comprise two elements: a bus interface which listens on the bus for addressing bytes (e.g. in response to a signal on SS or other protocol) and a processor which implements the modified SPI interface and may perform other functions, such as protocol conversion (as described above). In such examples, the bus interface may be able clock the addressing byte into the peripheral modules even if the processor is shutdown and when the address is complete, an interrupt or other means may then be used to wake the processor. This further decreases the power consumption of the module and the assembled device, which may further increase battery life. The bus interface element may comprise a microcontroller or FPGA.

The interface element 108 may also be arranged to control the communication from the peripheral module to the base module. This control may be through use of specified time slots for each peripheral module to use to send data to the base module. Alternatively, an interrupt may be used which any peripheral module can assert.

The base module 101 may also be able to reset the peripheral modules when required. In an example, the base module may send a signal causing an interface element to reset which then causes the peripheral device to be reset. Alternatively, the base module may send a signal to the interface element on a peripheral module that causes the interface element to reset the peripheral device. When a module/device is reset, it may be necessary to provide state or other data to the device and/or to calibrate the data, as described above with reference to powering up a peripheral device.

In addition to the SPI signals, the bus may also comprise means for controlling which digital signals are exposed on the connectors 109 on the peripheral modules. In such an example, a peripheral module may comprise a multiplexer, which may be controlled by a multiplexer controlling device which may be located on the peripheral module (and controlled across the bus) or elsewhere. This enables the peripheral module to be reconfigured (e.g. by reconfiguration of the multiplexer) to expose signals other than the standard SPI bus signals on the connector. For example, programming signals may be exposed to enable updating (e.g. reflashing) of any of the components on the peripheral module, e.g. to reprogram the microcontroller which implements the modified SPI interface element and performs protocol conversion (as described above) or to reprogram microcontroller in a Bluetooth or GSM module. This method may also be used to reprogram (or otherwise update) the interface element (e.g. the bus interface element). In order to reconfigure a peripheral module in this way, the module may be connected to a special interface device which controls the multiplexer as required and then drives the appropriate signals on the bus connector. In an example, the special interface device may control the multiplexer via the multiplexer controlling device and in another example the special interface device may comprise the multiplexer controlling device. The multiplexer may be controlled using a single pin, two wires, an analog signal, 1-wire (trade mark) as described below, or any other suitable technique.

Figure 11:
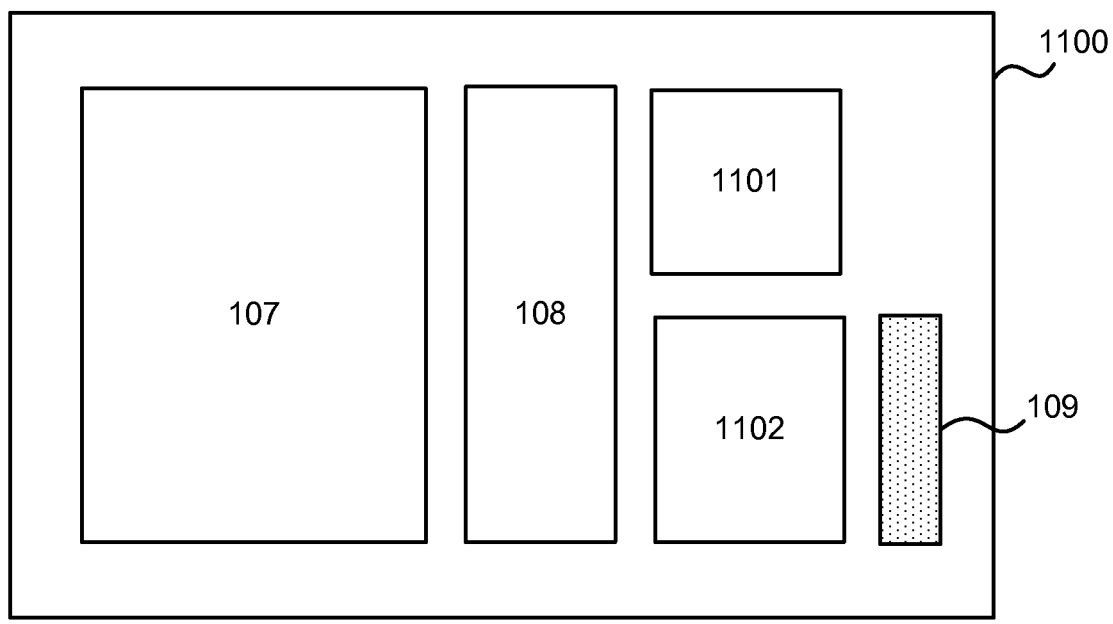
FIG. 11 shows a schematic diagram of a peripheral module.

In an example implementation, the bus may also include a bidirectional single wire communication means, such as a 1-wire (trade mark) bus. This may be used by the base module for many different purposes, such as to assign an address to the peripheral module which will be used in the addressing portion over the SPI interface and/or to provide configuration information to the interface device on a peripheral module. The single wire communication means may be used by the interface element on a peripheral module to interrogate the base module. In some examples, it may also be used to provide power to the peripheral modules. Where a single wire communication means, such a 1-wire (trade mark) bus, is used, each peripheral module 1100 may, in some examples, further comprise a control device 1101 (such as a 1-wire device) and a multiplexer 1102, as shown in FIG. 11. The control device 1101 comprises non-volatile configuration memory, an identifier unique to that module, a descriptor of the module function and/or digital output lines. The digital output lines are used to control the multiplexer 1102 that in turn controls which digital signals are exposed on the bus connector 109 (i.e. the control device 1101 acts as the special interface device, described above).

Instead of using a special interface device and multiplexer to reprogram a peripheral device, a peripheral device may be reprogrammed across the bus in an assembled device using the interface element. In such an example, the interface element may be provided with new firmware and then the interface element may install this onto the peripheral device. The interface element may comprise a special 'install mode' which performs this installation. By reprogramming in this way, a multiplexer is not required on the peripheral modules (where reprogramming may be required) and therefore the peripheral modules may be more compact.

In order to enable debugging of an assembled device, an interface on the processor 105 (e.g. a UART interface) on the base module 101 may be connected to a connector 112 (e.g. a mini-USB connector) via a suitable protocol converter chip (not shown in FIGS). This enables the device to be connected to a PC over USB and the debugging output will be available on the PC (e.g. when using printf( ) to get the code to print strings to a debug interface on the PC during execution of the code in order to convey the state of the program). If the processor 105 has more than one interface which may be used in debugging (e.g. more than one UART interface), these may be multiplexed onto the same USB channel (e.g. using a multiplexer) so that the required channel may be selected (e.g. via the PC) during debugging.

Whilst in the above description, the communication between modules is described as being via wired electrical connections, in some examples, some or all of the communication between modules may use a wireless link, such as Bluetooth, IrDA, optical or inductive technology.

Software and Firmware for the Modular Development Platform

The processor 105 on the base module may run a lightweight event-based (i.e. cooperative) kernel, referred to herein as wasp-OS. Wasp-OS may include a tiered hardware abstraction layer (HAL) which allows performance sensitive applications direct access to the hardware but also provides a relatively high-level API to hardware such as timers and $I^2C$, SPI and UART interfaces. By not directly supporting protocols such as TCP/IP or Bluetooth, the kernel is simplified and these protocols may be supported though the use of peripheral modules with processors, e.g. a GPRS modem module containing a processor that runs a TCP/IP stack. In addition to running the wasp-OS, the processor runs an embedded application which is specific to the particular assembled device.

Exemplary Methods of Development and Debugging

Both the wasp-OS and the application may be written using ANSI C. This enables the code to be easily targeted at (and ported to) different processors as long as an ANSI C compiler exists for that processor. Additionally, it enables the code (e.g. the wasp-OS, libraries and application code) to be compiled for x86 (e.g. using Visual Studio) and then run on a PC (e.g. as a single application under Microsoft Windows (trade mark)). This enables the PC debugging environment to be used for initial debugging and whilst several aspects cannot be tested on a PC, a large number of errors may be identified at this stage, therefore reducing the overall amount of time taken to debug the assembled device. A PC debugging environment is easier to use, faster, more powerful and efficient and in particular it enables virtually unlimited use of tools such as breakpoints. This provides a means of using a common environment for debugging assembled devices independent of the choice of processor for the actual prototype.

In a first method of debugging, a HAL may be used which re-directs peripheral access by the application running on the PC to a simulator for each peripheral. Such simulators may run on the PC as one or more separate applications (e.g. under Windows (trade mark)). The simulation may have a user interface (UI) showing the simulated peripherals and providing simulated buttons or other inputs which may be clicked on. Alternatively, the simulation may be completely embedded (e.g. a simulated flash memory). This method enables the embedded application development to proceed before any hardware is available. At this stage in the development cycle, the processor that will be used in the eventual device may not yet be known, therefore without this method, this early stage development would not be possible.

Figure 12:
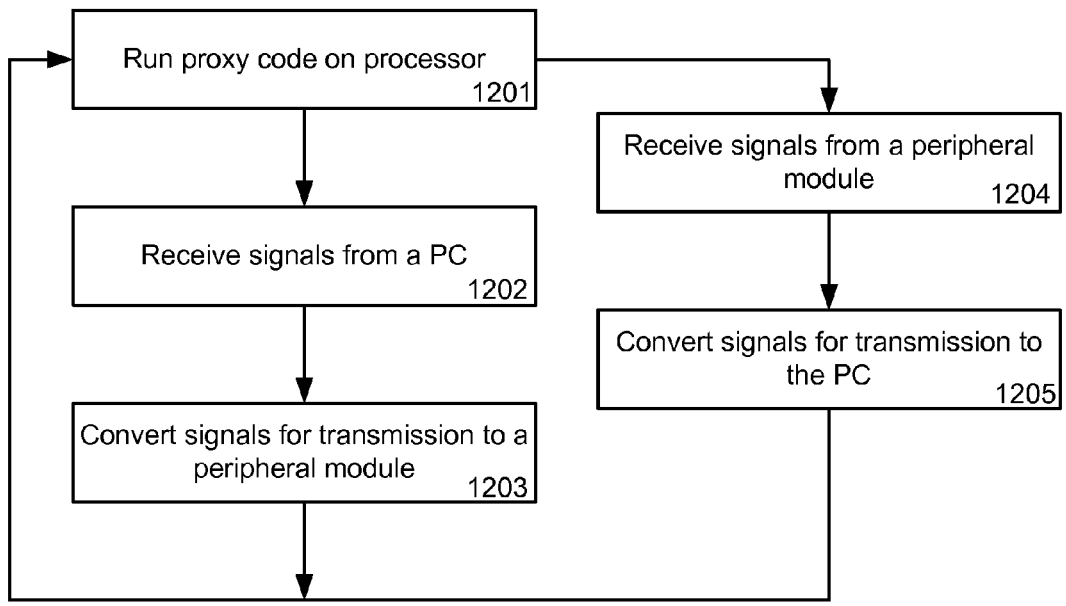
FIG. 12 shows a flow diagram of an example method of debugging a device.

In a second method of debugging a modified HAL may be used which accesses the real hardware peripherals via a proxy running on the processor 105 on the base module 101. The base module 101 may be connected to the PC via the mini-USB interface and the proxy, running on the processor, converts between USB and SPI and passes the communication onto the bus used within the assembled device. FIG. 12 shows an example flow diagram of this method, in which proxy code is run on the processor (block 1201) and the base module receives signals from the PC (block 1202), e.g. over the USB connection, which it converts into a form which is suitable for transmission to the peripheral module(s) (block 1203) e.g. conversion from USB to SPI. The base module may also receive signals from the peripheral module (block 1204) over the bus and these signals are converted into a form for sending to the PC (block 1205) e.g. conversion from SPI to USB. The signals received from the peripheral module may be received in response to a signal sent to the module by the PC or alternatively, the signal may be sent by the peripheral module independently of any communication from the PC. This method does not require any special hardware and enables the device to be debugged whilst in exactly the same form factor as the final prototype, the only difference being the USB connection between the base module 101 and the PC. Additionally it enables the communication and operation of the peripheral modules to be tested.

Whilst the communication between the code running on the PC and the hardware is asynchronous, this will not cause problems for most peripherals which themselves include some intelligence in the form of the interface element 108 and in some cases, additional processors. However, where parts of the application are time critical, some of the code may be migrated to the processor 105 on the base module (e.g. once initial debugging has occurred, for example using the first method described above) whilst the remaining code remains on the PC with the processor also running a proxy.

In the above examples, the PC is connected to the base module of the embedded device via USB, this is by way of example and other means may be used, including, but not limited to, RS232, a custom PCI card and IrDA.

Having been debugged to the extent possible on the PC (e.g. under Microsoft Windows (trade mark)) using the bus proxy, for example using one or more of the methods described above, the code is then compiled for the particular processor used and this is downloaded to the processor (e.g. over the USB link) and debugged further (e.g. using the specific Integrated Development Environment (IDE) for the selected processor). The wasp-OS may include a simple command-line interface to allow the real-time operation of the assembled device to be monitored and controlled using a serial interface (e.g. over USB). The command-line interface may also support simple scripting.

Whilst in the above examples, the wasp-OS and applications are all written in ANSI C, other high level languages may alternatively be used.

Whilst the above debugging methods are described with reference to the modular development platform described above, the methods are more generally applicable and may be used in other situations, e.g. for debugging an embedded device on a single PCB.

Exemplary Computing-Based Device

Figure 13:
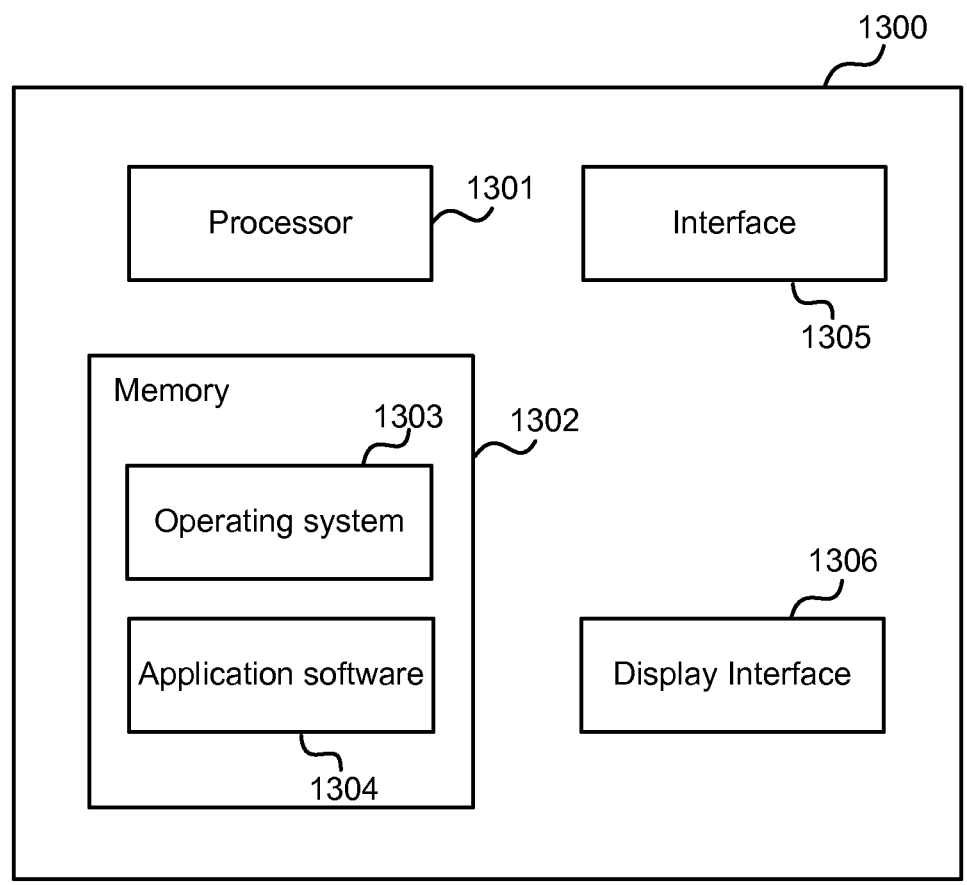
FIG. 13 illustrates an exemplary computing-based device in which embodiments of the debug methods may be implemented.

FIG. 13 illustrates various components of an exemplary computing-based device 1300 which may be implemented as any form of a computing and/or electronic device, and in which embodiments of the debug methods described above may be implemented.

Computing-based device 1300 comprises one or more processors 1301 which may be microprocessors, controllers or any other suitable type of processors for processing computing executable instructions to control the operation of the device in order to perform debugging on an embedded device.

The computer executable instructions may be provided using any computer-readable media, such as memory 1302. Platform software comprising an operating system 1303 or any other suitable platform software may be stored in the memory along with application software 1304, such as a debugging application, a compiler, the compiled code for the assembled embedded device etc. The memory is of any suitable type such as random access memory (RAM), a disk storage device of any type such as a magnetic or optical storage device, a hard disk drive, or a CD, DVD or other disc drive. Flash Memory, EPROM or EEPROM may also be used.

The computing-based device further comprises one or more interfaces including an interface 1305 (such as a USB interface) for communication with the assembled device, as described above, and a display interface 1306. The display interface 1306 connects to display system (not shown) to provide a user interface for the application software, such as the debugging application.

CONCLUSION

Although the present examples are described and illustrated herein as being implemented in a PC based system, the system described is provided as an example and not a limitation. As those skilled in the art will appreciate, the present examples are suitable for application in a variety of different types of computing systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person. Elements of any of the examples may be combined with any elements from any of the other examples to provide yet further examples.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein.

It will be understood that the above description of a preferred embodiment is given by way of example only and that various modifications may be made by those skilled in the art.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A modular prototype development platform comprising:
   a base module that sends, by a processor, data packets over a bus to individual ones of a plurality of peripheral modules, individual ones of the data packets including an addressing portion and a data portion;
   the plurality of peripheral modules, wherein an individual peripheral module of the plurality of peripheral modules includes an interface element that reads the addressing portion of a data packet to determine if the data portion of the data packet is for the individual peripheral module, the data portion including an instruction for the individual peripheral module to power up or power down within a sequence determined by the base module, wherein the sequence specifies that the individual peripheral module is to be powered up or powered down before or after one or more other peripheral modules of the plurality of peripheral modules are to be powered up or are powered down, and
   wherein the base module, the plurality of peripheral modules, and the bus form at least part of a single embedded prototype development device.

2. A modular prototype development platform according to claim 1, wherein the interface element passes the data portion to a peripheral device in the individual peripheral module if the interface element determines that the data portion is for the individual peripheral module.

3. A modular prototype development platform according to claim 1, wherein:
   the bus comprises a multi-drop serial peripheral interface (SPI) bus;
   the processor comprises an SPI interface; and
   the interface element comprises a modified SPI interface, wherein the modified SPI interface comprises a data input signal, a data output signal and a clock signal.

4. A modular prototype development platform according to claim 3, wherein the interface element performs protocol conversion from SPI to a protocol suitable for communication with a peripheral device in the individual peripheral module.

5. A modular prototype development platform according to claim 1, wherein the interface element causes a peripheral device in the individual peripheral module to enter a low power mode when the peripheral device is not in use.

6. A modular prototype development platform according to claim 1, wherein the interface element causes a peripheral device in the individual peripheral module to switch off when the peripheral device is not in use.

7. A modular prototype development platform according to claim 6, wherein the base module sends the data packet to initiate the switch off of the peripheral device.

8. A modular prototype development platform according to claim 6, wherein the interface element causes the peripheral device to switch on in response to receipt of another data packet with an addressing portion corresponding to an address allocated to the individual peripheral module.

9. A modular prototype development platform according to claim 8, wherein the interface element further:
   extracts state information from the peripheral device prior to causing the peripheral device to switch off; and passes the state information back to the peripheral device to switch on.

10. A modular prototype development platform according to claim 1, wherein the base module executes, by the processor, proxy code that converts first signals received from a computer for transmission over the bus to at least some of the plurality of peripheral modules and the proxy code converts second signals received over the bus from at least some of the plurality of peripheral modules for transmission to the computer.

11. A modular prototype development platform according to claim 10, wherein the base module comprises a serial interface for connection to the computer.

12. A modular prototype development platform according to claim 11, wherein the serial interface comprises a universal serial bus (USB) interface.

13. A modular prototype development platform according to claim 1, wherein at least one peripheral module further comprises a multiplexer and a multiplexer controlling device, wherein the multiplexer connects different signals to a connector in the at least one peripheral module according to signals received from the multiplexer controlling device.

14. A modular prototype development platform according to claim 13, wherein the multiplexer switches between a first set of signals connected to the connector for use in a first mode of operation and a second set of signals connected to the connector for use in a second mode of operation.

15. A modular prototype development platform according to claim 13, wherein the multiplexer controlling device comprises a bidirectional single wire communication bus.

16. A modular prototype development platform according to claim 15, wherein the bidirectional single wire communication bus comprises a serial peripheral interface bus.

17. A modular prototype development platform according to claim 1, wherein the sequence specifies that the individual peripheral module is to be powered up or powered down after the one or more other peripheral modules and the instruction comprises a pre-defined time delay for powering up or powering down the individual peripheral module.

18. A device comprising:
a base module that sends, by a processor, one or more data packets over a bus to individual ones of a plurality of peripheral modules, individual ones of the one or more data packets including an address and a data portion that includes an instruction to manage power consumption of the plurality of peripheral modules based at least in part on a staggered timing sequence determined by the base module to power up or power down the plurality of peripheral modules; and
the plurality of peripheral modules, an individual peripheral module of the plurality of peripheral modules including an interface element that:
reads the address of a data packet to determine if the address corresponds to an address associated with the individual peripheral module that includes the interface element; and
manages the powering up or powering down of the individual peripheral module within the staggered timing sequence based at least in part on the data portion that includes the instruction; and
wherein the base module, the plurality of peripheral modules, and the bus form a single prototype embedded device.

19. A device according to claim 18, wherein the interface element passes the data portion of the data packet to a peripheral device in the individual peripheral module if the address of the data packet corresponds to the address associated with the individual peripheral module.

20. A method comprising:
running proxy code on a processor of a base module connected to a plurality of peripheral modules in an embedded device prototype;
receiving first signals at the base module from a computer;
converting, by the processor of the base module, the first signals for transmission to the plurality of peripheral modules;
addressing the first signals to at least a first peripheral module and a second peripheral module of the plurality of peripheral modules;
transmitting the first signals to the first peripheral module and the second peripheral module of the plurality of peripheral modules, the first signals instructing the second peripheral module to power up or to power down after a predetermined time period has expired and after the first peripheral module has already powered up or powered down;
receiving second signals at the base module from the first peripheral module and the second peripheral module of the plurality of peripheral modules;
converting, by the processor of the base module, the second signals for transmission to the computer; and
transmitting the second signals to the computer.

* * * * *